US008417398B2

(12) United States Patent
Reichensperger

(10) Patent No.: US 8,417,398 B2
(45) Date of Patent: Apr. 9, 2013

(54) VEHICLE AND METHOD FOR DRIVE CONTROL IN A VEHICLE

(75) Inventor: Markus Reichensperger, Wiesloch (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 0 days.

(21) Appl. No.: 12/083,187

(22) PCT Filed: Aug. 5, 2006

(86) PCT No.: PCT/EP2006/007787

§ 371 (c)(1), (2), (4) Date: Apr. 4, 2008

(87) PCT Pub. No.: WO2007/039009

PCT Pub. Date: Apr. 12, 2007

(65) Prior Publication Data

US 2009/0254232 A1 Oct. 8, 2009

(30) Foreign Application Priority Data

Oct. 4, 2005 (DE) ........................ 10 2005 047 580

(51) Int. Cl.
*B65G 65/02* (2006.01)
*G05D 1/08* (2006.01)
*H02P 5/46* (2006.01)

(52) U.S. Cl. ............ 701/20; 104/121; 414/279; 318/41

(58) Field of Classification Search .................. 104/121; 187/249; 318/35, 38, 41, 53; 414/277, 279, 414/281, 282; 700/214; 701/19, 20, 50

See application file for complete search history.

(56) References Cited

U.S. PATENT DOCUMENTS

| | | | | |
|---|---|---|---|---|
| 3,792,758 | A * | 2/1974 | Wentz | 187/236 |
| 6,443,264 | B2 * | 9/2002 | Nakashima et al. | 187/249 |
| 7,205,730 | B2 * | 4/2007 | Taguchi | 318/69 |
| 7,257,463 | B2 * | 8/2007 | Taguchi et al. | 700/214 |
| 2002/0039527 | A1 * | 4/2002 | Kamide | 414/279 |
| 2004/0160201 | A1 | 8/2004 | Rahman et al. | |
| 2007/0253800 | A1 * | 11/2007 | Murakami | 414/277 |

FOREIGN PATENT DOCUMENTS

| | | |
|---|---|---|
| DE | 195 34 291 | 3/1997 |
| DE | 196 08 293 | 8/1997 |
| DE | 196 14 660 | 10/1997 |
| DE | 198 49 276 | 5/2000 |
| DE | 10 2004 006 023 | 9/2004 |
| EP | 1 061 035 | 12/2000 |
| EP | 1 172 326 | 1/2002 |

OTHER PUBLICATIONS

International Search Report, PCT International Patent Application No. PCT/EP2006/007787, dated Oct. 16, 2006.

Written Opinion of the International Searching Authority, PCT International Patent Application No. PCT/EP2006/007787, dated Oct. 16, 2006 (English-language translation provided).

Translation of International Preliminary Report on Patentability, PCT International Patent Application No. PCT/EP2006/007787, dated May 8, 2008.

* cited by examiner

*Primary Examiner* — S. Joseph Morano
*Assistant Examiner* — Zachary Kuhfuss
(74) *Attorney, Agent, or Firm* — Kenyon & Kenyon LLP

(57) ABSTRACT

A vehicle, including two controllable electrical drives, which are capable of being operated in mutual dependence, the rotational speed and the torque of a first drive, in particular a master drive.

16 Claims, 1 Drawing Sheet

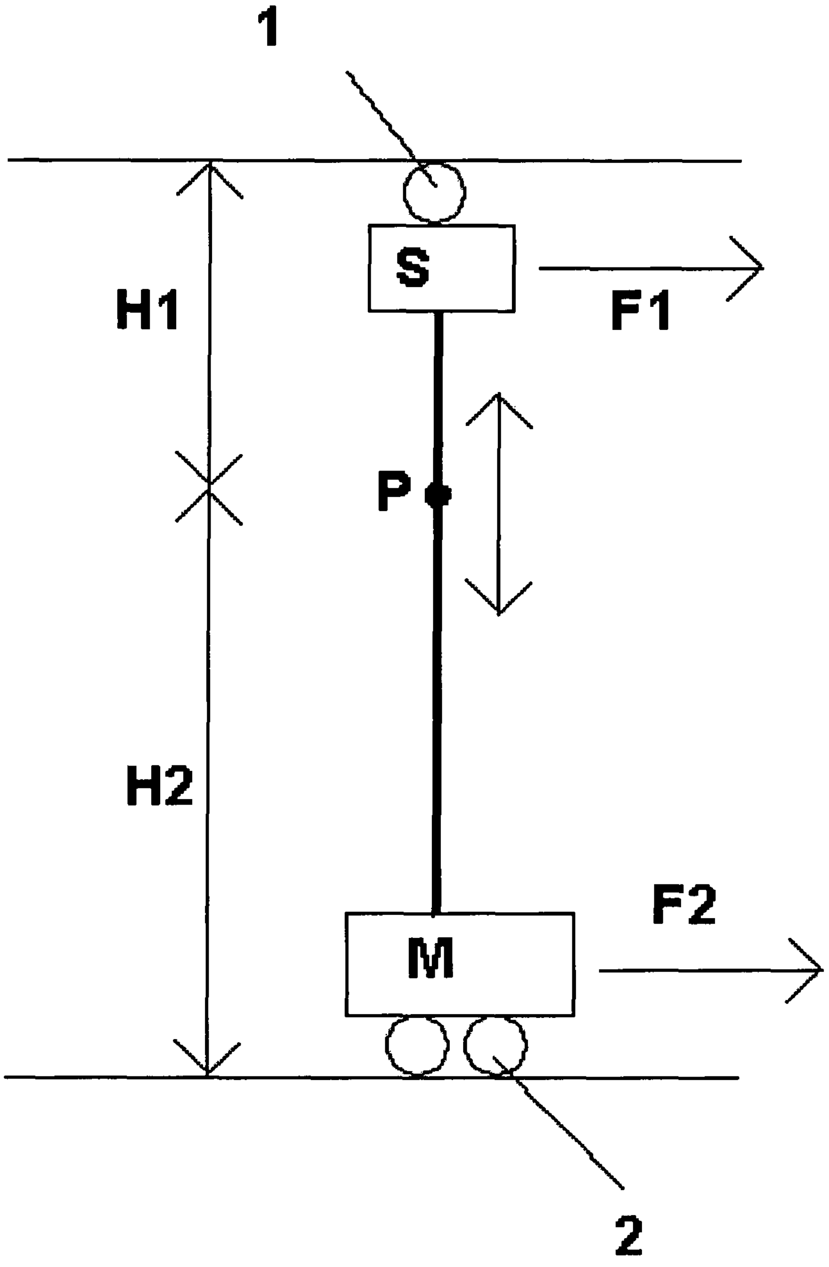
1
S
F1
H1
P
H2
F2
M
2

VEHICLE AND METHOD FOR DRIVE CONTROL IN A VEHICLE

FIELD OF THE INVENTION

The present invention relates to a vehicle and a method for drive control in a vehicle.

BACKGROUND INFORMATION

A stacker vehicle capable of cornering is described in German Published Patent Application No. 198 49 276.

SUMMARY

Example embodiments of the present invention provide a vehicle in which a stable driveability may be achieved.

According to example embodiments of the present invention, a vehicle includes two electrical drives that are connected for data transmission, the rotational speed and the torque or values of variables of the first drive, in particular the master drive, dependent on these or associated with these being able to be transmitted to a controller of the second drive, the rotational speed specification for the second drive, in particular the slave drive, being determinable by the controller in that the rotational speed and the torque or values of variables of the first drive dependent on these or associated with these and the torque or corresponding values of corresponding variables of the second drive dependent on these or associated with these are taken into account.

In particular, vehicles may be used that have one lower drive and one upper drive such as tall stacker cranes or stacker vehicles, for example. Particularly tall designs may be provided. Particularly in such applications, a stable driveability is important and the advantage of example embodiments of the present invention gain particular weight.

If the drives, contrary to example embodiments of the present invention, would be operated only in an operating mode synchronous with respect to rotational speed, and if the wheels are round and made of metal, for example, and thus could exhibit slip, then it could happen that the mast connecting the two drives, that is, the linkage, would have a non-zero variable angle of inclination. The mast could also experience tilt oscillations.

In example embodiments of the present invention, by contrast, it may be provided that the control system allows for a mast oscillation of the linkage connecting the drives to be reduced or even prevented. For the rotational speed and the torque of the master drive, for example, the lower drive of the vehicle, are known to the slave drive, for example the upper drive of the vehicle. Its own torque is also known to it. In this manner, it is able to determine the rotational speed of the slave drive such that an ideal distribution of force is established as a result. The ideal distribution exists when the lever arms, that is, torques applied on the center of gravity, are distributed such that no rotary motion of the connecting linkage is produced.

The force F1 produced by the slave has the distance H1 from the center of gravity and the force F2 produced by the master has the distance H2. If $F1 \times H1 = F2 \times H2$ is achieved, then a rotary oscillation and also a rotation become preventable. Thus the driveability becomes more stable.

In example embodiments of the present invention, the slave sets the controlled variable setpoint rotational speed accordingly, which makes the mentioned equation as readily achievable as possible.

Electric motors are used as drives, which drive at least one wheel via an interposed gear unit. It is also important that the wheel is not a toothed wheel or a wheel bound by friction in a slip-free manner to the bearing surface such as a rail or the like, but is rather one subject to slip. Such wheels are known, for example, in rail-bound transport systems. The system is thus of such a kind that a spinning of the wheels is not securely prevented.

The motor current of the electric motor may be used as the variable dependent on or associated with the torque, which motor current is known in any event to the control process in controllable drives. Rotational speeds may be determined either by angle sensors connected to the motor or by control processes that determine the rotational speed in their result.

The drives may respectively drive at least one wheel that is subject to slip, in particular the drives may produce the forward motion by wheels running on rails. The advantage here is that the wheels are inexpensive and that the rotational speed known to the drive is converted into an exactly determinable peripheral speed. The path speed of the point of contact, however, may differ from the peripheral speed when slip occurs. The mentioned rails are provided, for example, for guiding the vehicle securely. Such a rail may be provided particularly above and below the vehicle. Example embodiments of the present invention, however, are also applicable to vehicles that have differently situated rails such as, for example, laterally to the right and to the left of the vehicle. It is also applicable to railless systems in which wheels that are subject to slip roll on a bearing surface such as a floor surface, a lateral surface or a ceiling surface.

The controller may take into account the rotational speed and the motor current of the first drive and the motor current of the second drive. The advantage of this is that the rotational speed of the second drive is variable and specifiable as a controlled variable. A downstream rotational speed controller then controls the second drive to match this desired setpoint rotational speed. An accordingly modified torque then sets in, and the mentioned principle of leverage is substantially fulfilled such that no rotation or rotary motion is triggered.

The controller may be arranged as a proportional controller, that is, a P controller, or a PI controller, or a PID controller. The advantage of this is that known and simply structured controllers may be used in a quick and simple manner.

A system deviation may be supplied to the P controller, PI controller, or PID controller. In particular, the setpoint rotational speed specification for the second drive is such that at a vanishing system deviation the peripheral speeds of the wheels, in particular the path speed of the points of contact of the wheels, are identical. The advantage here is that, if the principle of leverage is correct, the wheels roll off in a precisely synchronous manner.

The system deviation may be a weighted difference of the motor currents, particularly of the kind (I_Slave_Actual−c×I_Master_Actual), where I_Slave_Actual is the actual motor current of the slave drive, thus corresponding to the torque of the slave drive, c is the weighting of the setpoint torque ratio of the two drives and I_Master_Actual is the actual motor current of the master drive, thus corresponding to the torque of the master drive. The weighting may make it possible to model the position of the center of gravity and thus is accordingly clearly determinable and specifiable. Thus, even when the center of gravity is variable, this value c may be calculated from the positional data of the center of gravity.

Calculating the position of the center of gravity from the arrangement of the known masses is a simple matter for one skilled in the art. Consequently, example embodiments of the present invention even make possible a calculable specification of this parameter. Parameter c, however, may also be determined by other methods or control methods as the result of a control process.

The drives may be connected via a linkage, particularly in a rigid manner. Advantageous in this regard is the fact that great forces may occur and that the system is simple to control and has little ability to oscillate.

The tracks of the wheels may be set apart from each other in parallel. The advantage in this case is that rails may be used for a rail-bound design. In particular, metal rails and metal wheels may be used, thus also wheels that have a metal bearing surface. Slip may occur in this instance. Example embodiments of the present invention, however, have a particularly advantageous effect especially in such systems.

The center of gravity may be variable in operation and the weighting c of the setpoint torque ratio of the two drives is adapted and/or changed accordingly. Example embodiments of the present inventions may be used in vehicles that include, for example, a lift cage or delivery cage that is capable of traveling vertically. Thus, the elevation of the center of gravity changes accordingly. The parameter c may be used to take into account the torque distribution of the drives with respect to the center of gravity. In this instance, it is clear that each drive produces a forward motion force. The center of gravity may be taken as the zero vector of space, that is, as the coordinate origin. Then the torque is obtained as the cross product of the respective position vector at the contact point of the forward motion force and the forward motion force of the respective drive. The goal is to achieve a mutual cancellation of the sum of all torques acting on the center of gravity. For this purpose, parameter c is selected accordingly. If the center of gravity shifts in operation, particularly in its elevation, then parameter c is changed accordingly such that there continues to be no resulting torque acting on the center of gravity. The control system is implemented such that it always tries to achieve this goal.

The vehicle may be arranged as a stacker vehicle, in particular one that is track-guided. Stacker cranes may be used. The may have a very tall mast, that is, the linkage that connects the upper and the lower end of the vehicle. Due to the great height, an upper and a lower drive are necessary. Both drives respectively drive wheels that run on a rail and are subject to slip. The mast oscillation that is in principle possible is reducible or even entirely preventable with the aid of example embodiments of the present invention.

At least two drives may be provided, the rotational speed and the torque or values of variables of the first drive dependent on these or associated with these being transmitted to a controller of the second drive, the rotational speed specification for the second drive being determined by the controller, wherein the rotational speed and the torque or values of variables of the first drive dependent on these or associated with these and the torque or corresponding values of corresponding variables of the second drive dependent on these or associated with these are taken into account.

The motor current may be used as variable instead of the torque. The motor current is closely connected to the torque and is readily and cost-effectively detectable. Instead of the rotational speed, the angle may be detected as well and be used by differentiation in the controller.

Parameters of the control method may be changed as a function of the position of the center of gravity. Even when transporting great loads and thus when there are substantial shifts in the center of gravity, mast oscillations are reducible or diminishable.

Further features and aspects of example embodiments of the present invention are described in more detail below with reference to the appended Figures.

LIST OF REFERENCE CHARACTERS

1 wheel
2 wheel
M master
S slave
P center of gravity
H1 path
H2 path
F1 force
F2 force

DETAILED DESCRIPTION

FIG. 1 symbolically shows a device according to an example embodiment of the present invention, which includes one master and one slave drive. Both are coupled via a linkage and respectively drive wheels, which may exhibit slip relative to the bearing surface, for example a rail.

This is a stacker vehicle, by way of example, the master drive having at least one wheel that runs on a rail laid out on the floor. The slave drive has wheel 2, which is also subject to slip, and which runs on a rail laid out above the vehicle. The diameters of wheels 1 and 2 may differ and may also change over the service life, for example due to varying wear.

If the wheels were known with geometric precision and no slip existed, then a synchronous operation of drives M and S would move the vehicle with outstanding uniformity, in particular the mast, that is, the linkage between the two drives, would not tilt. If the wheels were subject to slip, however, the synchronous operation would have the effect that an inclined mast would continue to be inclined. In addition, oscillations may arise.

In example embodiments of the present invention, the torque requirement of drives M and S is ascertained. Then the rotational speed is set or influenced such that an ideal force distribution results. For this purpose, the lever arms of the forces produced by the respective drives should be equal with respect to center of gravity P.

For example, the following should hold at least approximately: H1×F1=H2×F2. Thus, the center of gravity experiences a total force that results from the principal of leverage. Deviations are avoided according to example embodiments of the present invention, and thus the danger of oscillation is reduced as well. In particular, a buildup of the mast oscillations is avoided. Forces F1 and F2 are produced by the drives, the torques acting on the wheels and these producing the forces.

In example embodiments of the present invention, in particular the torque of the respective drive or an associated variable is determined such as the force of the drive in the direction of the rail or the like. For example, the motor current of the electric motor of the drive may be determined as well. For this is a variable directly correlated with the torque, in particular a variable proportionally correlated over a broad range.

The rotational speed of the slave drive is set such that it runs synchronously with the rotational speed of the master drive, a correction value being added, however. This value is determined as a function of the torques of the slave and master drive.

A first simple implementation is thus a controller provided in the slave drive, which receives information about the torque or motor current from the master drive, in particular via a communication medium such as, for example, a field bus such as a CAN bus, an Interbus or Profibus, Devicenet or Ethernet, or a wireless data transmission system such as Bluetooth or the like.

The controller then determines the setpoint rotational speed of the slave in the following manner:

$$N\_Slave\_Setpoint=K\times N\_Master\_Actual+b\times(I\_Slave\_Actual-c\times I\_Master\_Actual)$$

where: N_Slave_Setpoint is the setpoint rotational speed of the slave drive, K is a factor that produces identical revolution speeds if there is no system deviation, that is, when the bracketed expression is zero. N_Master_Actual is the actual rotational speed of the slave drive, b is the proportional share of the P controller, where I_Slave_Actual corresponds to the actual motor current of the slave drive, that is, to the torque of the slave drive, c is the weighting of the setpoint torque ratio of the two drives, I_Master_Actual is the actual motor current of the master drive, thus corresponding to the torque of the master drive. The center of gravity P of the vehicle is at a constant height H2.

In additional exemplary embodiments according to the present invention, instead of the proportional element, or in addition to the latter, further elements such integrating elements or differential elements are added. Precontrols may be successfully added as well.

In other exemplary embodiments according to the present invention, the measured current value is filtered, in particular using a PT1 element, that is, low-pass filtered.

In other exemplary embodiments according to the present invention, the center of gravity is at a variable height depending on the position of the lift cage or delivery cage, which may comprise a load to be delivered. In that case, paths H1 and H2 are not constant. The position of the center of gravity is then taken into account by a corresponding change in the value c. Thus, value c is provided for adaptation to changing center of gravity positions.

In other exemplary embodiments according to the present invention this may be also be done by an electronic circuit. The latter may also be provided with appropriate sensors.

A general advantage of the present invention is that one may dispense with a tilt sensor.

In other exemplary embodiments according to the present invention, more than two drives exist, one skilled in the art being able to extend the principles accordingly, and the setpoint rotational speed of the slave drive being determinable in this manner.

In other exemplary embodiments according to the present invention, the actual value of the output-side torque reduced by the frictional torques is used as the torque of the drive for the method. In particular, in additional exemplary embodiments, the motor current corresponds to the torque at the output of the electric motor and is used by the controller in its control method as the variable corresponding to the torque. In the process, the ascertained frictional torques are then taken into account. These include not only the losses in the downstream gear unit, but also braking torques of connected brakes as well as frictional torques when converting the rotational motion of the driven wheel on the rail, in particular when slip occurs. The described parameter c is adapted accordingly.

In other exemplary embodiments according to the present invention, these frictional torques are ascertained in advance in a test sequence, thus, prior to starting the method of the present invention. This may also be called a learning drive. In this manner, parameter c may be predetermined particularly well.

In other exemplary embodiments according to the present invention, parameter c is varied when driving the vehicle and thus the optimal value is discovered. For this purpose, the minimization of the mast oscillation and the angle of tilt are used as the optimization criterion.

What is claimed is:

1. A vehicle, comprising:

a first drive; and a second drive including a controller;

wherein the first drive and the second drive are connected for data transmission;

wherein at least one of (a) a rotation speed, (b) a torque, and (c) values of variables at least one of (i) dependent on and (ii) associated with at least one of (a) the rotational speed and (b) the torque of the first drive are transmittable to the controller of the second drive;

wherein the controller is configured to determine a rotational speed specification for the second drive in accordance with the at least one of (a) a rotation speed, (b) a torque, and (c) values of variables at least one of (i) dependent on and (ii) associated with at least one of (a) the rotational speed and (b) the torque of the first drive and in accordance with at least one of (a) a torque and (b) corresponding values of corresponding variables of the second drive;

wherein the drives are rigidly connected via a linkage;

wherein each drive is adapted to drive at least one respective wheel, which is subject to slip, to produce forward motion by the wheels running on rails.

2. The vehicle according to claim 1, wherein the first drive is arranged as a master drive and the second drive is arranged as a slave drive.

3. The vehicle according to claim 1, wherein each drive is adapted to drive at least one respective wheel that is subject to slip.

4. The vehicle according to claim 3, wherein the wheels have a metal bearing surface.

5. The vehicle according to claim 1, wherein the controller is configured to determine the rotational speed specification for the second drive in accordance with the rotational speed and a motor current of the first drive and a motor current of the second drive.

6. The vehicle according to claim 1, wherein the controller is arranged as at least one of (a) proportional controller, (b) a P controller, (c) a PI controller, and (d) a PID controller.

7. The vehicle according to claim 6, wherein a system deviation is suppliable to the controller.

8. The vehicle according to claim 1, wherein the rails in a rail-bound implementation are set apart from each other in parallel.

9. The vehicle according to claim 1, wherein the vehicle is at least one of (a) arranged as a stacker vehicle and (b) track-guided.

10. A vehicle, comprising:

a first drive; and a second drive including a controller;

wherein the first drive and the second drive are connected for data transmission;

wherein at least one of (a) a rotation speed, (b) a torque, and (c) values of variables at least one of (i) dependent on and (ii) associated with at least one of (a) the rotational speed and (b) the torque of the first drive are transmittable to the controller of the second drive;

wherein the controller is configured to determine a rotational speed specification for the second drive in accordance with the at least one of (a) a rotation speed, (b) a torque, and (c) values of variables at least one of (i)

dependent on and (ii) associated with at least one of (a) the rotational speed and (b) the torque of the first drive and in accordance with at least one of (a) a torque and (b) corresponding values of corresponding variables of the second drive;

wherein the drives are rigidly connected via a linkage;

wherein a setpoint rotational speed specification for the second drive is such that at a vanishing system deviation, peripheral speeds of wheels driven by the drives are identical.

11. A vehicle, comprising:

a first drive; and a second drive including a controller;

wherein the first drive and the second drive are connected for data transmission;

wherein at least one of (a) a rotation speed, (b) a torque, and (c) values of variables at least one of (i) dependent on and (ii) associated with at least one of (a) the rotational speed and (b) the torque of the first drive are transmittable to the controller of the second drive;

wherein the controller is configured to determine a rotational speed specification for the second drive in accordance with the at least one of (a) a rotation speed, (b) a torque, and (c) values of variables at least one of (i) dependent on and (ii) associated with at least one of (a) the rotational speed and (b) the torque of the first drive and in accordance with at least one of (a) a torque and (b) corresponding values of corresponding variables of the second drive;

wherein the drives are rigidly connected via a linkage;

wherein a setpoint rotational speed specification for the second drive is such that at a vanishing system deviation, peripheral speeds of wheels driven by the drives, and a path speed of points of contact of the wheels, are identical.

12. A vehicle, comprising:

a first drive; and a second drive including a controller;

wherein the first drive and the second drive are connected for data transmission;

wherein at least one of (a) a rotation speed, (b) a torque, and (c) values of variables at least one of (i) dependent on and (ii) associated with at least one of (a) the rotational speed and (b) the torque of the first drive are transmittable to the controller of the second drive;

wherein the controller is configured to determine a rotational speed specification for the second drive in accordance with the at least one of (a) a rotation speed, (b) a torque, and (c) values of variables at least one of (i) dependent on and (ii) associated with at least one of (a) the rotational speed and (b) the torque of the first drive and in accordance with at least one of (a) a torque and (b) corresponding values of corresponding variables of the second drive;

wherein a setpoint rotational speed specification for the second drive is such that at a vanishing system deviation, peripheral speeds of wheels driven by the drives are identical; and wherein the system deviation is a weighted difference of motor currents.

13. A vehicle, comprising:

a first drive; and a second drive including a controller;

wherein the first drive and the second drive are connected for data transmission;

wherein at least one of (a) a rotation speed, (b) a torque, and (c) values of variables at least one of (i) dependent on and (ii) associated with at least one of (a) the rotational speed and (b) the torque of the first drive are transmittable to the controller of the second drive;

wherein the controller is configured to determine a rotational speed specification for the second drive in accordance with the at least one of (a) a rotation speed, (b) a torque, and (c) values of variables at least one of (i) dependent on and (ii) associated with at least one of (a) the rotational speed and (b) the torque of the first drive and in accordance with at least one of (a) a torque and (b) corresponding values of corresponding variables of the second drive;

wherein a setpoint rotational speed specification for the second drive is such that at a vanishing system deviation, peripheral speeds of wheels driven by the drives are identical; and wherein the system deviation is a weighted difference of motor currents, according to (I_Slave_Actual−c× I_Master_Actual), I_Slave_Actual representing an actual motor current of a slave drive, c representing a weighting of a setpoint torque ratio of the two drives and I_Master_Actual representing an actual motor current of a master drive.

14. A vehicle, comprising:

a first drive; and a second drive including a controller;

wherein the first drive and the second drive are connected for data transmission;

wherein at least one of (a) a rotation speed, (b) a torque, and (c) values of variables at least one of (i) dependent on and (ii) associated with at least one of (a) the rotational speed and (b) the torque of the first drive are transmittable to the controller of the second drive;

wherein the controller is configured to determine a rotational speed specification for the second drive in accordance with the at least one of (a) a rotation speed, (b) a torque, and (c) values of variables at least one of (i) dependent on and (ii) associated with at least one of (a) the rotational speed and (b) the torque of the first drive and in accordance with at least one of (a) a torque and (b) corresponding values of corresponding variables of the second drive;

wherein a setpoint rotational speed specification for the second drive is such that at a vanishing system deviation, peripheral speeds of wheels driven by the drives are identical;

wherein the system deviation is a weighted difference of motor currents, according to (I_Slave_Actual−c× I_Master_Actual), I_Slave_Actual representing an actual motor current of a slave drive, c representing a weighting of a setpoint torque ratio of the two drives and I_Master_Actual representing an actual motor current of a master drive; and wherein a center of gravity is variable in operation and the weighting c of the setpoint torque ratio of the two drives is at least one of (a) adapted and (b) changed according to the center of gravity.

15. A method for drive control in a vehicle, comprising:

transmitting at least one of (a) a rotational speed, (b) a torque, and (c) values of variables of a first drive of the vehicle at least one of (i) dependent on and (ii) associated with at least one of (a) the rotational speed and (b) the torque of the first drive to a controller of a second drive of the vehicle; and determining, by the controller, a rotational speed specification for the second drive in accordance with at least one of (a) the rotational speed, (b) the torque, and (c) the values of the variables of the first drive at least one of (i) dependent on and (ii) associated with at least one of (a) the rotational speed and (b) the torque of the first drive and in accordance with at least one of (a) a torque and (b) corresponding values of corresponding variables of the second drive;

wherein the drives are rigidly connected via a linkage;

wherein each drive is adapted to drive at least one respective wheel, which is subject to slip, to produce forward motion by the wheels running on rails.

16. The method according to claim 15, further comprising changing parameters of the method as a function of a position of a center of gravity.

* * * * *